Feb. 21, 1939.  E. W. DAVIS  2,147,830
LUBRICATING APPARATUS
Filed Jan. 18, 1936
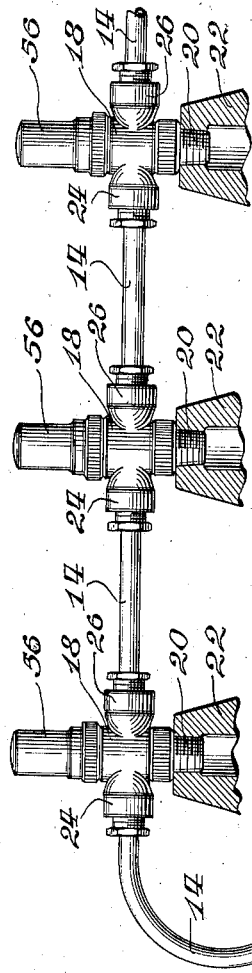
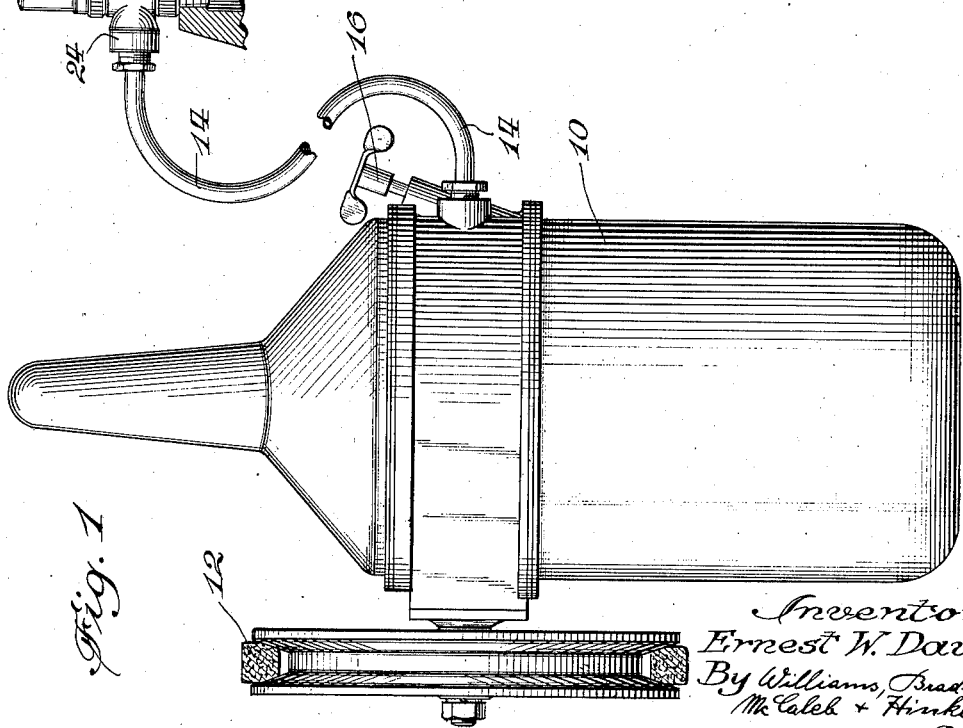
Inventor:
Ernest W. Davis.
By Williams, Bradbury,
McCaleb & Hinkle
Attys.

Patented Feb. 21, 1939

2,147,830

UNITED STATES PATENT OFFICE 2,147,830

LUBRICATING APPARATUS

Ernest W. Davis, Oak Park, Ill., assignor to Stewart-Warner Corporation, Chicago, Ill., a corporation of Virginia Application January 18, 1936, Serial No. 59,668

8 Claims. (Cl. 184—7)

My invention relates generally to lubricating apparatus and more particularly to centralized lubricating systems for industrial use.

It is an object of my invention to provide an improved measuring valve for use in centralized lubricating systems, which will accurately measure and feed to a bearing to be lubricated a charge of lubricant upon the application of lubricant under pressure thereto.

It is a further object of my invention to provide a measuring valve usable in centralized lubricating systems which will operate effectively without by-passing lubricant even though the pressure applied is not accurately maintained for the required time, or other irregularities in lubricant pressure application are encountered.

A further object is to provide an improved measuring valve which is of simple construction, will not readily become out of order, can be easily assembled, and may be economically manufactured.

Other objects will appear from the following description, reference being had to the accompanying drawing, in which:

Fig. 1 is an elevation of a lubricating system, showing a plurality of lubricant measuring valves, each associated with a bearing which is shown in cross section;

Fig. 2 is a central vertical sectional view of my improved measuring valve.

The measuring valve of my invention is adapted to be used in a centralized lubricating system in which the lubricant is intermittently supplied under pressure to measuring valves, wherein the lubricant is temporarily stored under pressure and thereafter gradually fed to the bearings during the intervals between the application of lubricant pressure from the source.

In Fig. 1 the source is illustrated as a combined pump and reservoir unit 10 which may be driven by a belt 12 from any suitable source of power and in which the intervals between application of lubricant pressure to the discharge conduit 14 may be controlled by a needle valve 16. This pump and reservoir unit is fully disclosed in my copending application, Serial No. 49,173, filed November 11, 1935, but it will be understood that any suitable source of lubricant under pressure may be employed. The discharge conduit 14 connects the pump with a series of measuring valves, each comprising a body 18 threaded in an outlet bushing 20, the latter having a threaded shank by which the valve may be secured to a bearing 22. The conduit arrangement may be of any desired form. The measuring valves may be connected in series, or in parallel, or in any desired branched arrangement. Whenever one of the measuring valves is located at the end of a conduit, the unused conduit connection may be readily closed by means of an ordinary pipe plug.

The body 18 of the valve comprises a pair of sockets 24, 26 to receive the ends of conduit 14, suitable compression couplings being preferably used to form oil-tight joints. The body has a central bore 28 which is at all times in communication with the conduit 14 through passageways 30 and 32.

Within the bore 28 is a valve 34 normally pressed by a spring 36 against its seat 38 which is formed at the end of an outlet passageway 40 formed in the outlet bushing 20. The stem 42 of the valve 34 has an annular groove 44 cut therein to receive a cupped piston 46, which may be made of oil resistant rubber, of leather or of any other suitable material. The stem 42 is enlarged at 48 to provide a backing for the piston 46 and a seat for spring 36.

The upper end 49 of the stem 42 is cylindrical in shape and extends through an aperture 50 formed in the body of the valve. A hat washer 52 forms a seal around the stem portion, being backed by a suitable washer 55 secured in position by a storage reservoir 56. The reservoir is provided with a piston formed by a cup washer 58 pressed over a headed projection 60 formed on the piston body 62, the piston being pressed downwardly by a compression coil spring 64. The reservoir above the piston 58, 60 is vented to the atmosphere through a port 66.

Communication between the space 68 beneath the piston 58, 60 and the space 70 beneath the piston 46 is provided by a passageway 72 extending through the stem 42, the upper end of the stem having a slot 74 cut therein to prevent the projection 60 from closing or restricting the upper end of the passageway.

It will be noted that downward movement of the piston 58, 62 is limited by engagement of its projection 60 with the upper end of the stem 42, and that downward movement of the stem is limited by engagement of the valve 34 with its seat 38. Upward movement of the stem is limited by abutment of a shoulder 76 with the wall of the body adjacent the opening 50.

When in operation, the pump will periodically discharge lubricant under high pressure into the discharge conduit 14, whence it will flow to all the measuring valves connected to the conduit system. When the pressure at a measuring valve is built up sufficiently to overcome the force of the spring 64, lubricant will flow downwardly past the cup washer piston 46, which acts as a check valve, and upwardly through the passageway 72 into the space 68 beneath the piston 58 of the storage reservoir, forcing the piston upwardly and compressing the spring 64. During this time the valve 34 is held closed, not only by its spring 36, but because of the pressure of the lubricant, which is effective over an area equivalent to that of the valve seat 38, since the discharge passageway 40 will normally be at atmospheric pressure.

After all of the measuring valves have thus been charged with lubricant, the pressure in the discharge conduit will be reduced appreciably (usually to substantially atmospheric pressure), and the lubricant contained in each of the storage reservoirs will then be discharged into the respective bearings in the following manner:

As soon as the pressure in the passageways 30, 32 is reduced, the piston washer 46 acts as a piston seal or check valve, preventing return flow of lubricant from the pressure reservoir to the conduit. Instead, the lubricant forced from the pressure reservoir by the spring pressed piston 58, 62 exerts an upwardly directed force upon the cup washer piston 46, raising the valve 34 from its seat 38, and permitting the lubricant to flow from the pressure reservoir through the passageway 72, past the valve 34, into the bearing 22. After all of the lubricant has been discharged from the storage reservoir, the springs 36 and 64 will cooperate firmly to force the valve 34 against its seat 38, whereupon all of the parts will be in condition for operation upon the next periodic application of lubricant pressure from the pump.

Since the capacity of the measuring valve is dependent upon the size of the expansible storage reservoir, the measuring valves may be made of any desired capacity merely by unscrewing the reservoir 56 and replacing it with one of the required capacity. The adjustment of the capacity of the measuring valve to the needs of the bearing may thus be easily effected, and manufacturers and dealers in the valves may reduce their inventories because it will be necessary to retain in stock an assortment of reservoirs instead of an asortment of complete measuring valves.

The measuring valve of my invention may be used with various kinds of oil, light grease, or other fluid, and may be used not only in lubricating systems, but in any other kind of fluid distributing system in which it is desired to deliver a measured charge of fluid at each of a plurality of separated stations.

While I have illustrated and described a preferred embodiment of my invention, many modifications may be made without departing from the spirit of the invention and I do not wish to be limited to the precise details set forth but desire to avail myself of all changes within the scope of the appended claims.

Having thus described my invention, what I claim as new and desire to secure by Letters Patent of the United States is:

1. A measuring valve for centralized lubricating systems comprising a body having an inlet for connection to a source of lubricant intermittently placed under pressure and an outlet for connection to a part to be supplied with lubricant by said measuring valve, a cylinder in said body having one end in communication with said inlet and its other end in communication with said outlet, a piston assembly reciprocable in said cylinder, a check valve preventing flow of lubricant from the outlet end to the inlet end of said cylinder while permitting flow in the opposite direction, a valve member carried by said piston normally closing said outlet, an expansible lubricant storage reservoir, and a passageway connecting said reservoir with the outlet end of said cylinder.

2. A measuring valve for centralized lubricating systems comprising a body having an inlet for connection to a source of lubricant intermittently placed under pressure and an outlet for connection to a part to be supplied with lubricant by said measuring valve, a cylinder in said body having one end in communication with said inlet and its other end in communication with said outlet, a piston assembly reciprocable in said cylinder, means for preventing flow of lubricant from the outlet end to the inlet end of said cylinder while permitting flow in the opposite direction, a stem forming part of said piston assembly, an expansible reservoir in alignment with said cylinder, said reservoir having an opening to receive said stem, means forming a seal around said stem, and a passageway in said stem connecting said reservoir with the outlet end of said cylinder.

3. A measuring valve for centralized lubricating systems comprising a body having an inlet for connection to a source of lubricant intermittently placed under pressure and an outlet for connection to a part to be supplied with lubricant by said measuring valve, a cylinder in said body having one end in communication with said inlet and its other end in communication with said outlet, a piston assembly reciprocable in said cylinder, means preventing flow of lubricant from the outlet end to the inlet end of said cylinder while permitting flow in the opposite direction, a stem forming part of said piston assembly, a cylindrical reservoir in alignment with said cylinder, a passageway connecting said reservoir to the outlet end of said cylinder, a spring pressed piston in said reservoir and abutting against said stem at the end of its stroke, and a valve carried by said stem and arranged to be retained in position closing said outlet port by the force exerted by said spring pressed piston when the latter is pressed against said stem.

4. A measuring valve for centralized lubricating systems comprising a body having an inlet for connection to a source of lubricant intermittently placed under pressure and an outlet for connection to a part to be supplied with lubricant by said measuring valve, a cylinder in said body having one end in communication with said inlet and its other end in communication with said outlet, a piston assembly reciprocable in said cylinder, means preventing flow of lubricant from the outlet end to the inlet end of said cylinder while permitting flow in the opposite direction, a valve for closing said outlet, a relatively light spring exerting a force to hold said outlet valve closed, a storage reservoir communicating with the outlet end of said cylinder, a spring pressed piston in said reservoir, and means to transmit force from said spring pressed piston to said valve to supplement the force of said light spring in holding said outlet valve closed after said spring pressed piston has discharged its contents through said outlet.

5. A measuring valve for centralized lubricating systems comprising a body having an inlet for connection to a source of lubricant intermittently placed under pressure and an outlet for connection to a part to be supplied with lubricant by said measuring valve, a cylinder in said body having one end in communication with said inlet and its other end in communication with said outlet, a piston assembly reciprocable in said cylinder, means preventing flow of lubricant from the outlet end to the inlet end of said cylinder while permitting flow in the opposite direction, an expansible storage reservoir, and a stem forming part of said piston assembly and projecting from said cylinder into said storage reservoir, said stem having a passageway extending therethrough and connecting said reservoir with the outlet end of said cylinder.

6. A measuring valve for centralized lubricating systems comprising a body portion having a compartment therein including an inlet thereto for connection with a source of lubricant intermittently placed under pressure and an outlet for communication with a part to be lubricated, lubricant-pressure responsive means dividing said compartment between said inlet and outlet and permitting flow of lubricant under pressure only from the inlet side of said compartment to the outlet side thereof, an expansible pressure reservoir for lubricant in communication with the outlet side of said compartment, a one-way valve controlling communication between said expansible reservoir and the inlet side of said compartment, and valve means associated with said pressure responsive means normally closing said outlet and opening same when said reservoir supplies lubricant under pressure to the outlet side of said compartment.

7. A measuring valve for centralized lubricating systems comprising a body portion having a compartment therein including an inlet thereto for communication with a source of lubricant intermittently placed under pressure, and an outlet for communication with a part to be lubricated, means dividing said compartment between said inlet and outlet and permitting flow of lubricant from the inlet side to the outlet side of said compartment while preventing flow in the opposite direction, said means being responsive to pressures imposed upon lubricant on the outlet side of said compartment, means associated with said pressure responsive means for normally closing said outlet, and expansible reservoir means in communication with the outlet side of said compartment and charged with lubricant when said intermittent pressure is supplied, for supplying the outlet side of said compartment with lubricant under pressure when said intermittent pressure is reduced, whereby said pressure responsive means actuates said means associated therewith to open said outlet to permit flow of lubricant to said part to be lubricated.

8. A measuring valve for centralized lubricating apparatus comprising a body having an inlet for connection to a source of lubricant intermittently placed under pressure and an outlet for connection to a bearing to be supplied with lubricant by said measuring valve, a cylinder in said body having one end in communication with said inlet and its other end in communication with said outlet, a one-way pressure responsive piston structure reciprocable in said cylinder and constructed and arranged to permit flow of lubricant from the inlet end to the outlet end of said cylinder and to prevent flow in the opposite direction, an outlet closing valve carried by said piston structure, a spring engaging said piston structure and normally holding said valve closed, an expansible lubricant storage reservoir, and a passageway extending from the outlet of said cylinder through said piston structure to said reservoir.

ERNEST W. DAVIS.